Feb. 7, 1933.  C. G. HAWLEY  1,896,895

DUST SEPARATOR

Filed March 1, 1932

INVENTOR
BY Charles G. Hawley
Mason & Mason,
ATTORNEYS

Patented Feb. 7, 1933

1,896,895

UNITED STATES PATENT OFFICE

CHARLES GILBERT HAWLEY, OF CHICAGO, ILLINOIS

DUST SEPARATOR

Application filed March 1, 1932. Serial No. 596,139.

The invention relates to improvements in the art of separating various substances from fluid streams, and the invention comprises a separator adapted for inclusion in fluid lines or pipes; more particularly, such as are used for the conveyance of gases, from which dust and moisture should be removed.

Such flowing fluids are known as "carriers"; meaning any fluid that is directed or kept in motion between given points; whether liquid, gaseous or vaporous and whether hot or cold, or a mixture; and, the terms foreign or entrained substances is to be understood as meaning any and all carrier conveyed matters, whether solid or fluid, and of less or greater weight than the carrier. The condition and shape of such particles often permit them to be centrifugally separated, as herein provided, even though of less weight than the carrier.

The objects of the invention are to provide a separator which shall be adapted for direct inclusion in a carrier line or pipe; which shall offer little resistance to the flow of carrier therein; which shall comprise a minimum number of parts and all of simple construction; which shall comprise only fixed or stationary parts and be free from rotating parts; which shall be effective to remove substantially all the foreign substances from the carrier and to discharge the same from the line; which shall be of small size, weight and cost as compared with other separators of approximate capacities and efficiencies; which shall be durable and strong; which shall be shipable and installable as a single unit; which shall be substantially self-cleaning; and adapted for easy dismemberment and removal from the line.

This separator is of a centrifugal type. That is, upon entering the same the fluid is caused to rotate rapidly and to project the heavier substances against an internal or restraining wall. The heavier substances are collected and removed from that wall; and if desired the invention accomplishes a differentiation and separation of the several substances carried by the fluid.

Importantly, this separator is composed of coaxial members which are in axial alignment with the carrier pipe served thereby. The fluid movement proceeds from the inlet of the separator directly to the outlet; the linear movement of the fluid being modified only by a whirling action which is imparted thereto and which reliably effects a centrifugal separation of the foreign substances before said outlet is reached.

The invention as a whole and its several parts and elements will be described by reference to the accompanying drawing, wherein.

The foregoing objects, and others hereinafter mentioned, are all attained in, and the invention comprises, a line separator of the construction herein illustrated or typified.

The device comprises two parts $a$ and $b$, which have companion flanges $a'$ and $b'$ fastened together by bolts $c$ so that they form a single tight casing.

The part $b$ is termed the inlet bell and has a flange $b''$ for connecting it to a carrier pipe of a size which corresponds with the opening $b^3$.

The part $a$ is termed the body of the separator and terminates in a flange $a''$ which contains the central outlet $a^3$.

Within the member $a$ is the separating chamber A which presents a cylindrical wall $A'$. The term cylindrical here signifies an easily machined surface $A'$, and any departure therefrom lessens the efficiency of the separator.

As shown, the chamber A is of somewhat greater diameter than the outlet $a^3$; leaving the end portion $A''$, which portion is machined as a cone. Thereby the outlet $a^3$ is provided with an upstanding and outwardly angled lip, A'', comprising a pressure effecting lip, and again referred to hereinafter.

Figures 4, 5:
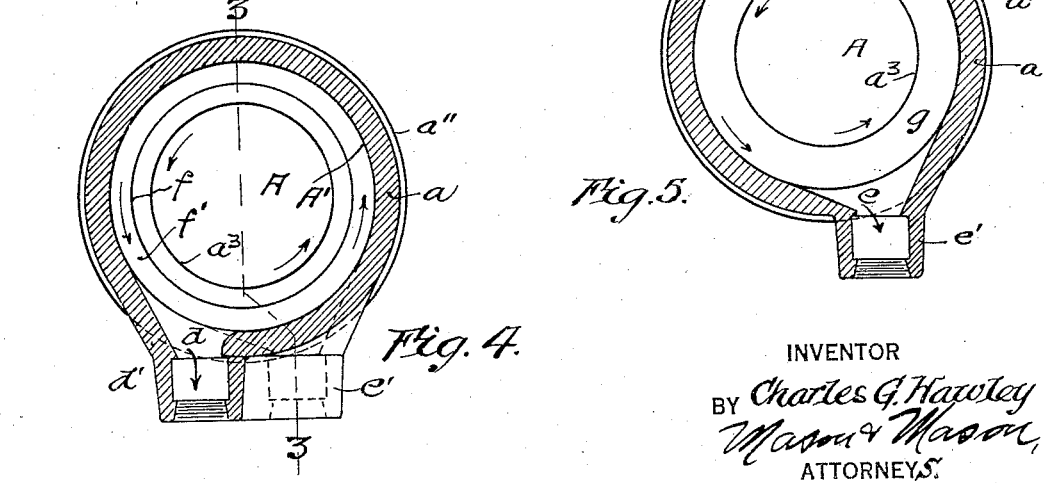
Fig. 4 is a cross section on the line 4—4 of Figs. 3 and 6.
Fig. 5 is a similar section on the line 5—5.

The length of the chamber A about equals its diameter. Its cylindrical wall is perforated at two points, as follows: Adjacent the outlet $a^3$, but at different distances therefrom and in the same side of the member $a$, are two lateral passages $d$ and $e$, and through these the separated foreign substances are ejected. Preferably, and as shown respectively in Figs. 4 and 5, the passages $d$ and $e$ depart tangentially from the chamber A. Preferably also they merge with corresponding individual nozzles $d'$ and $e'$; which latter are cast upon the body $a$ and are threaded to receive pipes that lead to suitable disposal or collection pockets or traps.

Between the openings $d$ and $e$ and shouldering inwardly from the surface A' is a rib $f$; of substantially triangular form in cross section. This circumferential rib is preferably a separate metal part, the inclined shoulder $f'$ whereof is flush with the passage $d$, that is, it is adapted to direct collected substances thereinto. The rib or shoulder ring member $f$ is machined to fit a stop shoulder $f''$ in the surface A', and is fastened against the same.

A circumferential groove $g$, termed a race, remains between the ring $f$ and the angled lip A''. This race is adapted to receive and to direct stray foreign substances into the eject passage $e$.

The internal diameter of the rib $f$, while smaller than that of the chamber A, is considerably larger than that of the outlet $a^3$; leaving the lip A'' exposed beyond the rib $f$.

The member interposed between the inlet $b^3$ and the chamber A is a whirl producing tuyère by which the carrier fluid moving from the inlet toward the outlet is set into rapid rotation in advance of the parts $d$, $f$, $e$, A'' and $e^3$.

This tuyère preferably comprises the central portion $h$ together with a plurality of blades $h'$ and a circumferential band $h''$. That band $h''$ is securely held between and is fixed by the two parts $a$ and $b$ of the casing. When those parts are separated the tuyère may be removed, but at other times it is fixed and non-rotative.

Figures 1, 2:
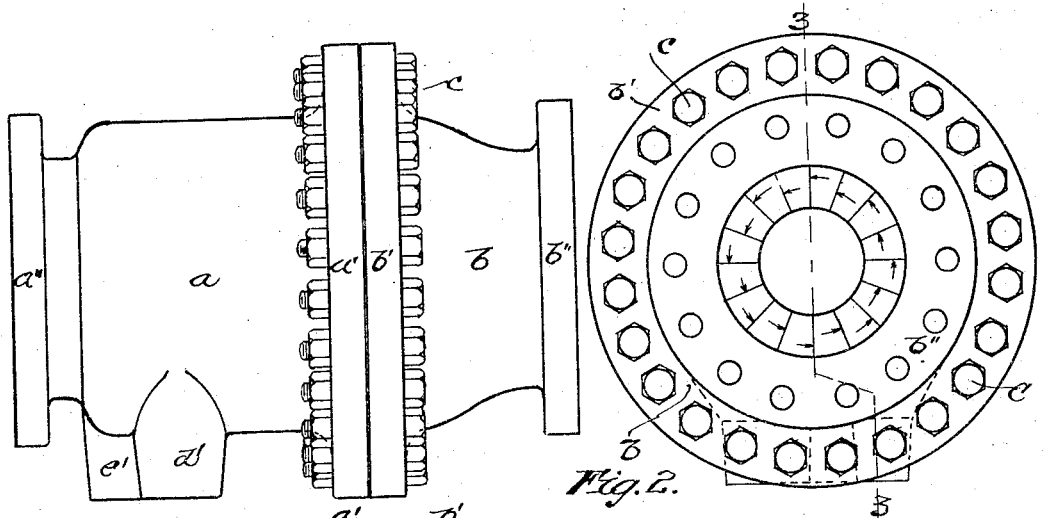
Fig. 1 is a side view of the novel separator.
Fig. 2 is a view of the inlet end thereof.
Figures 3, 6:
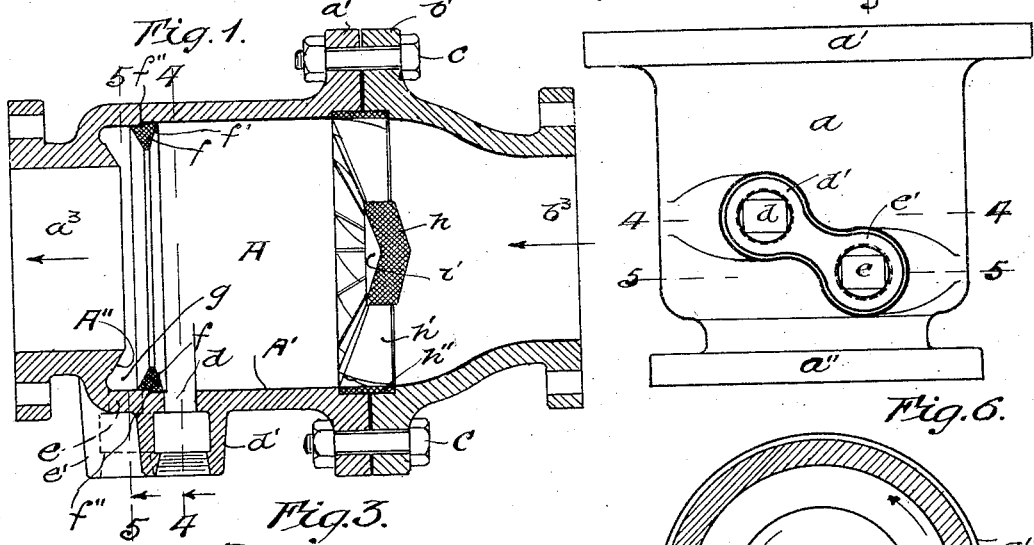
Fig. 3 is a longitudinal section, on the line 3—3 of Figs. 2 and 4.
Fig. 6 is a bottom side view of the main part of the separator, showing the position of the eject nozzles which project from the side thereof.

Instead of rotation imparted by a rotating part, the rotation and whirling of the carrier is brought about by disposing the fixed blades $h'$ angularly. All blades have a common direction; as shown by the arrows in Fig. 2; and, consistent with the tangential eject passages $d$ and $e$.

A blade inclination of forty-five degrees is sufficient and the aggregate available area of the passage which they afford between the part $h$ and the wall A' need be only slightly, if any, greater than the area of the outlet $a^3$. The opposition of the blades to the moving carrier results in very little loss of pressure (pressure drop) in the separator and yet the carrier is set into very rapid rotation in the chamber A.

In consequence of such rotation, the foreign substances are projected spirally against the wall A' and upon reaching the shoulder $f'$ are whirlingly impelled and directed into the eject opening $d$. The carrier fluid whirls outward across the circumferential rib $f$ and escapes through the outlet $a^3$. Meantime, the escaping or stray substances which failed of ejection at $d$ are crowded past the rib $f$ and are whirlingly lodged in the race $g$. The angled rib A'' meets or intercepts the peripheral portion of the whirling body of fluid and tends to keep the race $g$ constantly filled with carrier at a high pressure; which ensures the ejection of the collected substances through the passage $e$. Hence the term pressure effecting lip, as used in describing the part A''.

The inner end of the tuyère contains a central and generally conical sink $i$, termed a vortex cone. As well known, every vortex has a tendency to draw substances to its center. This tendency is defeated with the pressure of the cone $i$. Its concavity is presented toward the outlet $a^3$, and the lowest pressure within the separator exists within the sink $i$. Its presence results in the temporary retention of substances which otherwise would reach the axis of the chamber A. Such substances are intercepted and first held at the margin of the sink $i$, and then, taking on the whirling motion within the chamber A, are centrifugally ejected toward and against the wall A'. The effect of this vortex defeating cone or element ($i$) is very positive. In further explanation it may be pointed out that the small or stray quantities of substance which reach and pass the edge of the cone as the result of whirling motion toward the outlet orifice are caught in the void occasioned by the presence of the cone within the vortex or whirling body of fluid, such particles being displaced inwardly by the streams of carrier fluid whirling toward the outlet. The individual particles, because of lack of mass, are intercepted and temporarily held on the inner margin of the conical cup; and, as the individual particles become agglomerated with others and attain sufficient mass they are centrifugally expelled from the inner margin of the cone, being there under the influence or impulsion of the vortex. Thus stray particles which escape accumulation in the major operation within the fixture and which might otherwise escape along the axis of the vortex are positively intercepted as they approach that axis and are centrifugally expelled toward and into the outer parts of the fixture, where they are absorbed into and disposed of along with the major accumulations or masses of separated substances.

A separator of the construction here exemplified and as contrasted with other line separators of approximately equal capacities, is of comparatively small size and weight; the total pressure drop through it is comparatively small, and its efficiency is very high. Intended primarily for the cleaning of natural and artificial gases it operates to remove both dust and moisture from such gases. However, it is not limited to such uses and is of general utility in carrier lines of all kinds.

It has not been thought necessary to illustrate the pockets or traps which are connected with this separator to receive the foreign substances therefrom. Such pockets or traps may be of any of the ordinary kinds employed with line separators.

A tuyère of the kind herein employed is separately described and claimed in my companion application entitled Whirl-promoting tuyère for separators, Serial No. 337,598, filed February 5, 1929.

Having thus described my invention, I claim as new and desire to secure by Letters Patent:—

1. A line separator of the fixed centrifugal type, comprising a two part casing containing a cylindrical separating chamber, in combination with a whirl-promoting tuyère fixed in and forming the inlet of said chamber, the other end of said chamber containing a central outlet of less internal diameter than said chamber, two eject passages adjacent said outlet and leading tangentially from said chamber at different distances from said outlet, a circumferential rib shouldered inwardly from the wall of said chamber and positioned to direct substances into the first of said passages, and an angled lip forming the inner margin of said outlet and with said rib completing a race which delivers stray substances to the second of said passages.

2. A line separator of the fixed centrifugal type, comprising a two part casing containing a cylindrical separating chamber, in combination with a radially bladed whirl-promoting tuyère fixed by and between the two parts of said casing and forming the inlet of said chamber, said tuyère having a central conical sink in its exit end, the opposite end of said chamber containing a central outlet of less internal diameter than said chamber and spaced from said tuyère, two separate eject passages adjacent said outlet and leading tangentially from said chamber, and a circumferential rib shouldered inwardly from the wall of said chamber between said passages and containing an opening which is concentric with but of greater diameter than said outlet.

In testimony whereof I have hereunto set my hand this 25th day of February, 1932.

CHARLES GILBERT HAWLEY.